Jan. 31, 1967   A. M. SHALLOWAY   3,301,071
CONTROL APPARATUS
Filed June 24, 1963   3 Sheets-Sheet 1
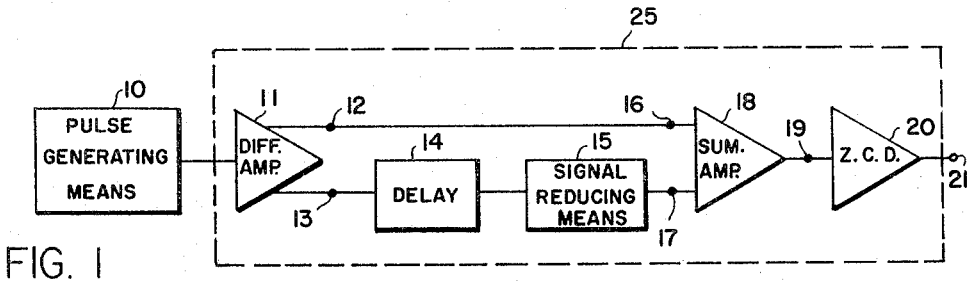
FIG. 1
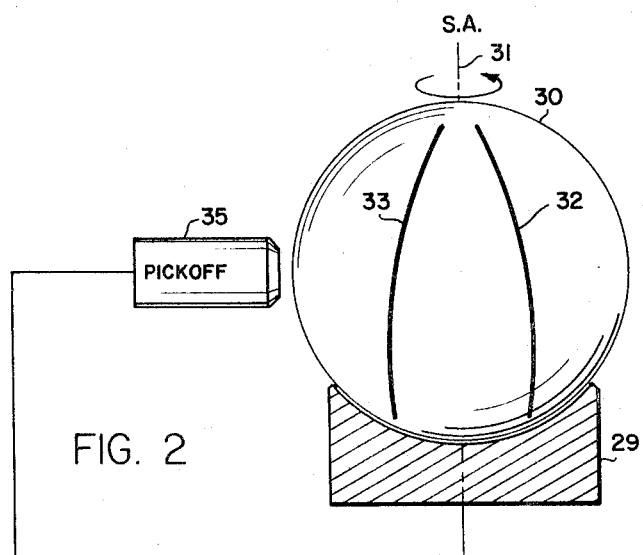
FIG. 2
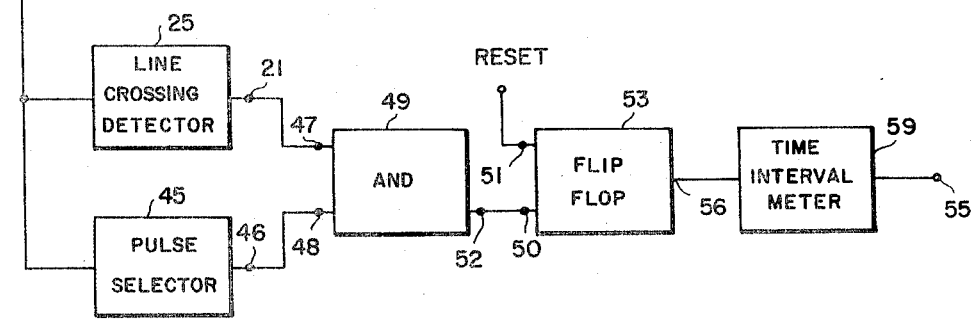
INVENTOR.
ARTHUR M. SHALLOWAY
BY Roger W. Jensen
ATTORNEY

FIG. 3
FIG. 3a
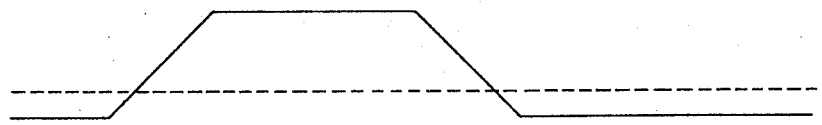
FIG. 3b
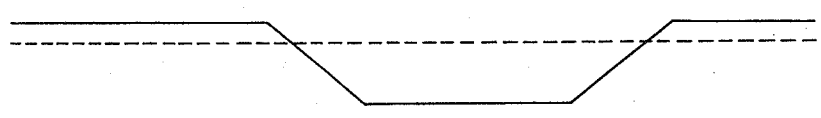
FIG. 3c
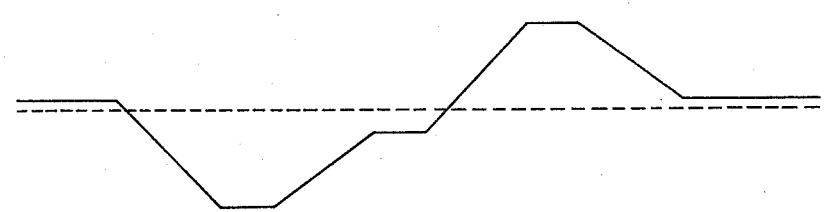
FIG. 3d
FIG. 3e
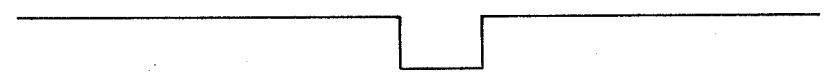
FIG. 4
FIG. 4a
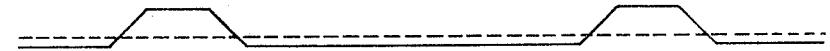
FIG. 4b
FIG. 4c
INVENTOR.
ARTHUR M. SHALLOWAY
BY
ATTORNEY Jan. 31, 1967   A. M. SHALLOWAY   3,301,071
CONTROL APPARATUS Filed June 24, 1963   3 Sheets-Sheet 3

INVENTOR.
ARTHUR M. SHALLOWAY
BY Roger W. Jensen
ATTORNEY

United States Patent Office 3,301,071
Patented Jan. 31, 1967

3,301,071
CONTROL APPARATUS
Arthur M. Shalloway, Green Bank, W. Va., assignor to Honeywell Inc., a corporation of Delaware
Filed June 24, 1963, Ser. No. 290,130
6 Claims. (Cl. 74—5.6)

This invention provides means to determine with high accuracy the location of corresponding points on consecutive pulses emanating from a pulse source. When accurate measurement of the time separation between two pulses is required, the difficulty often arises due to differences which exist between the pulses themselves. If, for example, all the pulses are of equal magnitude and are in all other respects similar, then a fairly accurate time measurement between two consecutive pulses would be made by simply measuring the time from the time the first signal reaches a certain level to the time the second signal reaches the same level. The accuracy of such an arrangement, however, decreases appreciably where the signals are not of equal magnitude, especially with the signals having relatively slow rise times. Furthermore, the signals whose magnitude is smaller than the preset signal level, would not be detected at all by such prior art arrangement.

Consider a situation where the signals or pulses are provided by an optical pickoff or sensor observing some patterned surface in relative motion with said pickoff, the pattern being comprised of a number of lines whose reflectivity differs from the reflectivity of the rest of the surface. A pulse is produced at the output of the pickoff every time the pickoff crosses the line and the measurement of the time elapsing between consecutive crossings of lines may provide information such as the attitude or the relative velocity of the moving member. A specific example of the situation described here would be a gyroscopic instrument in which the inertial member is supported by electric or magnetic fields free of physical contact with the rest of the instrument and where the information from the inertial member is obtained through optical pickoffs observing some pattern on the inertial member. The reference to an optical pickoff in combination with a reflective and nonreflective pattern is obviously only an example and is not intended to be a limitation. Many other arrangements are possible and are included within the meaning of the terms used here. The optical pickoffs could, for example, be replaced by radiation sensors and the pattern could be comprised of radiative and nonradiative portions. In short, this invention finds its application in any situation where pulses are provided, the distribution of said pulses along the time axis containing some useful information and the nature of the pulses and the accuracy requirements being such that it is necessary to determine the time of the occurrence of a specific part of the pulse.

In the example of the optical pickoff observing the line pattern on the inertial member of a gyroscopic instrument proper detection of the reference lines requires that an electrical signal be produced at a time a specific part of the line crosses under the pickoff. The problem is compounded by the fact that the line and the pickoff aperture must be large, compared to the resolution desired, to produce a usable signal to noise ratio. The lines of the pattern must be made wider than any blemishes which might naturally be present on the surface of the inertial member. The signal from the pickoff varies as the square of the aperture diameter, whereas, the resolution decreases linearly with the diameter. The electrical signal from the pickoff also contains noise generated by the reflectance variations of the rotor material. Furthermore the signal level can vary due to various factors such as the amount of light available at the surface for reflection, or changes in the characteristics of the light sensor. The present invention solves the problem stated above by providing means for detecting a point on the leading or trailing edge of the pulse, which is always at a specific percentage value of the pulse amplitude. One of the great advantages of this invention is that it uses a percentage value of the maximum signal as a reference rather than a preset signal level. In this way the resultant signal is relatively independent of the rise time, variance in reflectivity, and any such factors which vary with the signal amplitude. An additional advantage of this invention is that it also greatly minimizes any errors due to D.C. component of the signal. In solving the problem, the invention employs a unique principle of using a signal as its own amplitude reference. How this can be accomplished will become clear upon examination of the specification, claims, and drawings in which:

FIGURE 1 is a block diagram of a line crossing detector which is the subject of this invention;

FIGURE 2 shows an application of the invention to a gyroscopic instrument;

FIGURE 3 illustrates the signals appearing at various points of the apparatus of FIGURE 1 in their proper time relationship;

FIGURE 4 illustrates the signals appearing at various points of the apparatus of FIGURE 2;

Figure 5:
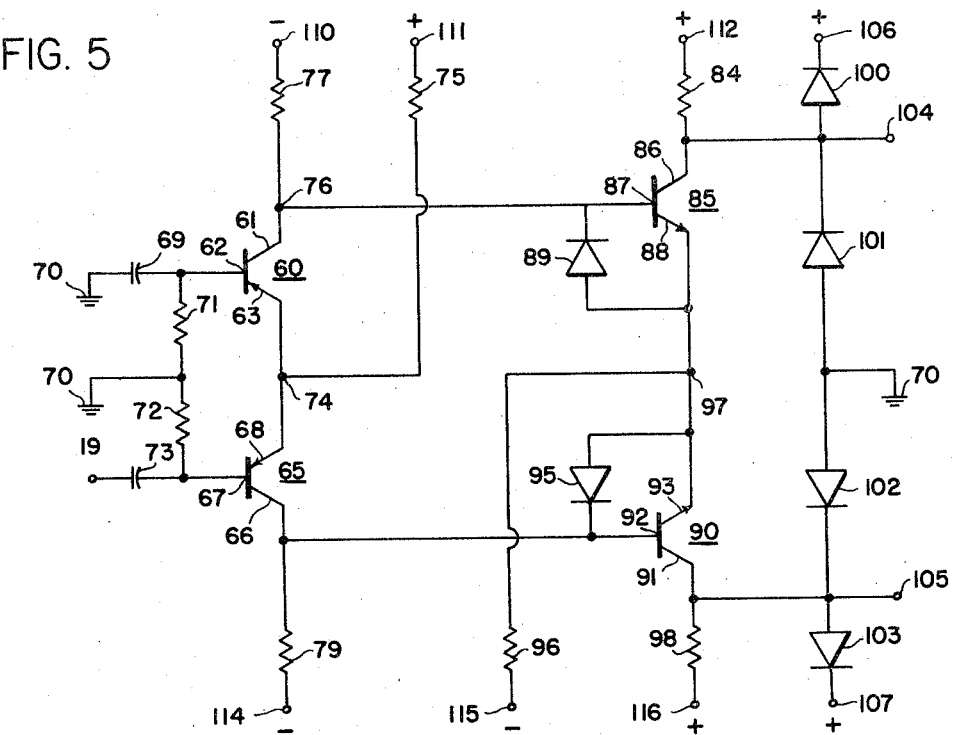
FIGURE 5 shows a schematic diagram of a zero crossing detector which might be employed in the apparatus of FIGURE 1.

Referring now to FIGURE 1, a pulse generator 10 has its output connected to the input of a differential amplifier 11 which in turn has outputs 12 and 13. Output 12 of differential amplifier 11 is connected to an input terminal 16 of a summing amplifier 18. Summing amplifier 18 further has an input terminal 17 and an output terminal 19. The output terminal 13 of differential amplifier 11 is connected to an input of a delay means 14. The output of delay 14 is connected to the input of a signal reducing means 15. The output of signal reducing means 15 is connected to input 17 of a summing amplifier 18. The output terminal 19 of summing amplifier 18 is connected to inputs of a zero crossing detector 20 which further has an output terminal 21. The differential amplifier means 11, delay 14, signal reducing means 15, summing amplifier 18, and the zero crossing detector comprise a line crossing detector 25.

Pulse generating means 10 could take many different forms. It could, for example, be comprised of an optical pickoff vewing a pattern of contrasting lines. The term is intended to generally cover the entire group of such possible pulse sources.

The operation of FIGURE 1 may be best explained by referring to waveforms illustrated in FIGURE 3. Assume that a pulse appears at the output of pulse generating means 10. This output pulse is presented to the input of differential amplifier 11 which in turn provides two complementary outputs at output terminals 12 and 13. By complementary it is meant that the signals at the two output terminals are equal in magnitude but negative of each other. The signals appearing at output terminal 12 of differential amplifier 11 is shown in FIGURE 3a. This signal is fed directly into input 16 of summing amplifier 18. The signal appearing at output 13 of differential amplifier 11, however, is delayed by delay 14 and reduced to a certain predetermined fraction by signal reducing means 15, and consequently fed into summing amplifier 18 at input terminals 17. The signal appearing at input terminal 17 of summing amplifier 18 is illustrated in FIGURE 3b. The reversed polarity, reduced magnitude, and phase difference (introduced by delay means 14) of the signal appearing at input 17 of amplifier 18 compared to the signal at input 16 thereof is easily noted by comparison of FIGURES 3a and 3b. The output signal of summing amplifier 18 is an inverted sum of its input signals appearing at terminals 16 and 17. This output signal of summing amplifier 18 is illustrated in FIGURE 3c. The output signal of summing amplifier 18 is acted on by zero crossing detector 20 which provides an output only when the input signal is positive. The signal appearing at output 21 of zero crossing detector 20 consequently is a pulse whose leading edge corresponds to the time when the input signal to the zero crossing detector crosses the zero reference level from the negative to the positive side. The signal appearing at output terminal 21 of zero crossing detector 20 is illustrated in FIGURE 3d.

It can be seen from FIGURE 3 that the leading edge of the output pulse from zero crossing detector 20 appears at a time when the trailing edge from the output of pulse generating means 10 reaches a certain fraction of its maximum. This fraction is the same as that fraction of its maximum signal to which the output signal appearing at terminal 13 of differential amplifier 11 is reduced by signal reducing means 15. The leading edge of the pulse appearing at output 21 of zero crossing detector 20 can therefore be adjusted to appear at any time corresponding to any point on the trailing edge of the pulse from the pulse generating means by reducing the signal from output 13 of differential amplifier 11 to an appropriate fraction of its maximum.

In FIGURE 1 the differential amplifier 11, delay 14, signal reducing means 15, and the summing amplifier 18 can be any one of the appropriate prior art devices well known to those skilled in the art. Various types of zero crossing detectors are also known to those who are skilled in the art. The zero crossing detector can be a high gain amplifier which provides an output signal when the input signal is positive and no output signal when the input signal is negative, or vice versa. A Schmitt trigger such as shown on page 396 of Semiconductor Devices and Applications by R. A. Griner, published by McGraw-Hill Book Company, in 1961, could also serve as a zero crossing detector. One characteristic of the zero crossing detector must be a fast switching time. If, for example, the signal from the zero crossing detector is gated to a time interval meter which uses a one-hundred megacycle clock, it is desirable for the output of the zero crossing detector to switch in one clock interval or ten nanoseconds. A schematic diagram of a possible circuit to be used as a zero crossing detector is shown in FIGURE 5.

In FIGURE 2 an inertial member 30 is supported on a base 29 and adapted to rotate about a spin axis 31. An optical pickoff 35 observes the surface of the inertial member 30 which has inscribed thereon a pattern comprised of lines 32 and 33. The output of pickoff 35 is connected to the input of line crossing detector 25 and a pulse selector 45. The line crossing detector's output terminal 21 is connected to an input terminal 47 of an AND circuit 49. AND circuit 49 further has another input 48 and an output 52. Pulse selector 45 also has an output terminal 46 connected to input terminal 48 of AND circuit 49. The output 52 of AND circuit 49 is connected to an input 50 of a flip-flop 53. Flip-flop 53 further has another input terminal 51 and an output 56. The input terminal 51 of flip-flop 53 is adapted to receive a reset signal from a means not shown in this application, and the output 56 of flip-flop 53 is connected to the input of a time interval meter 59. The time interval meter 59 also has an output terminal 55.

As the spherical member 30 rotates about spin axis 31, lines 32 and 33 successively pass under pickoff 35. As each line crosses under the pickoff, a pulse is produced at the output of pickoff 35. Assume that the pattern on the spherical member 30 is comprised exclusively of lines 32 and 33 and that the angular separation between the two lines in radians or degrees is a function of latitude of the sphere along the spin axis. Further assume that the sphere is rotating about spin axis 31 at a uniform rate or at a changing rate varying according to a known relation. At the output of pickoff 35 then will appear two pulses during each revolution of the sphere, the time separation of those two pulses being a function of the latitude at which the pickoff 35 is looking. If the time separation between the two pulses can now be accurately measured, then accurate relationship of the spherical member 30 to the pickoff or some other reference system to which the pickoff 35 is rigidly attached can be determined.

The signals of pickoff 35 are transmitted in parallel to line crossing detector 25 and to pulse selector 45. The operation of line crossing detector 25 has been explained in detail with reference to FIGURES 1 and 3 and the output signal of the line crossing detector appearing at output terminal 21 is illustrated in FIGURE 4b as related to the signal appearing at the output of pickoff 35 which is illustrated in FIGURE 4a. The function of pulse selector 45 is to determine whether or not the pulse appearing at the output of pickoff 35 has been produced by the crossing of a line 32 or 33 or whether the pulse has been caused by some other defect on the surface of the sphere. When the pattern is applied to the sphere 30 lines 32 and 33 are intentionally made wider than any surface anomalies or scratches which could interfere with the pattern. The pulse selector 45 eliminates all the pulses which are shorter than a specified minimum length. It provides an output only after a pulse has existed for a certain minimum time interval, that time interval corresponding to the minimum length of the pulse allowed. The output of pulse selector 45 is shown in FIGURE 4c as related to the output of the line crossing detector in FIGURE 4b. The signals from line crossing detector 25 and pulse selector 45 are applied to input terminals 47 and 48 of AND circuit 49 and the AND circuit 49 provides an input signal for the flip-flop 53 changing its state whenever AND circuit 49 receives signals coincidentally from both line crossing detector 25 and pulse selector 45. Flip-flop 53 is also provided with a reset signal at the beginning of each revolution at its input 51 which assures that the correct sequence occurs in the passing of the lines 32 and 33 under pickoff 35.

As line 32 passes under the pickoff 35 the state of flip-flop 53 is changed and the time interval meter 59 is fired or turned on and when the second line 33 passes under the pickoff 35 the state of flip-flop 53 is returned to the original condition turning the time interval meter 59 off. The time interval meter 59 therefore measures accurately the separation of lines 32 and 33 at the latitude observed by pickoff 35, this separation being indicative of the sphere latitude as viewed by the pickoff 35.

FIGURE 5 illustrates one possible configuration of zero crossing detector which is simply a high gain amplifier with relatively linear characteristics near zero voltage input. It is basically comprised of two similar stages of difference amplifiers.

An input terminal 19 is connected to a base 69 of a transistor 65 through a capacitor 73. Transistor 65 also has a collector 66 and an emitter 68. Base 67 is further connected to ground 70 through a resistor 72. Emitter 68 of transistor 65 is connected directly to an emitter 63 of a transistor 60. Emitter 68 of transistor 65 is further connected directly to a positive potential source 111 through a resistor 75. Transistor 60 also has a collector 61 and a base 62.

Collector 66 of transistor 65 is connected to a negative potential source 114 through a resistor 79 and to a base 92 of a transistor 90. Transistor 90 further has a collector 91 and an emitter 93.

Base 62 of transistor 60 is connected to ground 70 through a capacitor 69 in parallel with a resistor 71. Collector 61 of transistor 60 is connected to a negative potential source 110 through a resistor 77 and to a base 87 of a transistor 85. Transistor 85 further has a collector 86 and an emitter 88. Collector 86 of transistor 85 is connected to an output terminal 104 and to a positive potential source 112 through a resistor 84. Emitter 88 of transistor 85 is connected directly to emitter 93 of transistor 90 and to base 87 of transistor 85 through a diode 89 connected for forward current flow from emitter 88 to base 87. Emitter 88 of transistor 85 and emitter 93 of transistor 90 are connected to a negative potential source 115 through a resistor 96. Emitter 93 of transistor 90 is further connected to base 92 of transistor 90 through a diode 95 oriented for forward current flow from emitter 93 to base 92. Further, the collector 91 of transistor 90 is connected to an output terminal 105 and to a positive potential source 116 through a resistor 98.

The signals appearing at the output terminals 104 and 105 are constrained within certain limits by a series of clamping diodes. A diode 100 is connected between output terminal 104 and a positive potential source 106 oriented for forward current flow from terminal 104 to potential source 106. Diode 100 limits the positive excursion of the signal at terminal 104 to the magnitude of the positive potential source 106. In addition diode 101 is connected between output terminal 104 and ground potential 70 for current flow from ground 70 to terminal 104. Diode 101 limits the signal at terminal 104 from going negative more than a few tenths of a volt. Similarly a diode 103 is connected between output terminal 105 and a positive potential source 107 oriented for current flow from terminal 105 to potential source 107 thereby limiting the signal at terminal 105 from becoming more positive than the magnitude of the positive potential source 107. Also a diode 102 is connected between ground 70 and output terminal 105 to limit the negative going signal to not more than a few tenths of a volt.

In considering the operation of the zero crossing detector, assume initially that there is no input signal at the input terminal 19. During this condition transistors 60, 65, 85 and 90 will be conducting some quiescent value of operating current.

The quiescent current of transistor 60 flows the path from positive potential source 111 through resistor 75, through emitter 63 and collector 61 of transistor 60, and through resistor 77 to negative potential source 110. The current path for transistor 65 is from positive potential source 111 through resistor 75, emitter 68 and collector 66 of transistor 65 and through resistor 79 to a negative potential source 114. The path of the current through transistor 85 is from positive potential source 112 through resistor 84, collector 86, and emitter 88 of transistor 85, and resistor 96 to negative potential source 115. Finally, the D.C. current path of transistor 92 is from positive potenial source 116 through a resistor 98, through collector 91 and emitter 93 of transistor 90, and through resistor 96 to a negative potential source 115. The function of diodes 89 and 95 is to prevent the problem of base emitter breakdown of transistors 85 and 90 respectively.

Since for the condition of null input signal the biasing arrangement of transistors 60 and 65 is such that they are conducting, collectors 61 and 66 of transistors 60 and 65 respectively will be at positive potential. Bases 87 and 92 of transistors 85 and 90, which are connected to collectors 61 and 66 of transistors 60 and 65 respectively, will also be at a positive potential tending to maintain transistors 85 and 90 in conducting state. Collectors 86 and 91 of transistors 85 and 90 will consequently tend to be at negative potential, but will actually be very close to zero potential due to the clamping diodes 101 and 102.

Assume now that a positive signal is applied to input terminal 19. This will tend to reduce the conduction of transistor 65 making terminal 74 at emitter 68 of transistor 65 more positive. This in turn will cause transistor 60 to conduct more making terminal 76 of collector 61 of transistor 60 more positive. Base 87 of transistor 85 now becomes more positive and transistor 85 goes into increased conduction tending to make collector 86 of transistor 85 more negative. Collector 86, however, was already at negative potential in the quiescent state of the amplifier and was limited from going into a more negative potential by diode 101. The potential at output terminal 104 therefore will not be affected by a positive signal at input terminal 19.

Collector 66, however, will, due to decreased conduction of transistor 65, become more negative in turn making base 92 of transistor 90 more negative. This will make transistor 90 conduct less making collector 91 of transistor 90 positive, the magnitude of the positive potential being limited by diode 103 and positive potential 107. Since the amplifier has a high gain the signal at output terminal 105 will reach its limiting value almost immediately after the signal at input terminal 19 crosses from a negative to a positive value.

When the input signal at terminal 19 is negative just the opposite is true. The output signal at terminal 105 remains close to zero or slightly negative being limited by diode 102 and the output signal at terminal 104 is a positive signal limited by potential 106 through diode 100. To serve as a zero crossing detector, the output signal is taken from only one of the output terminals 104 or 105. The signal is taken between either terminal and ground 70. In FIGURE 1 where it is shown by the aid of FIGURE 3 that it is desired to determine a point where the signal crosses from negative to positive, the output signal of the zero crossing detector should be taken between output terminal 105 and ground 70. Therefore, terminal 105 of zero crossing detector in FIGURE 5 would correspond to terminal 21 at the output of zero crossing detector in FIGURE 1. If the signal from the summing amplifier 18 in FIGURE 1 were inverted then to get the same result it would be necessary to know when the signal crosses from the positive to the negative side and the output should be taken between terminals 104 and ground 70.

Figure 6:
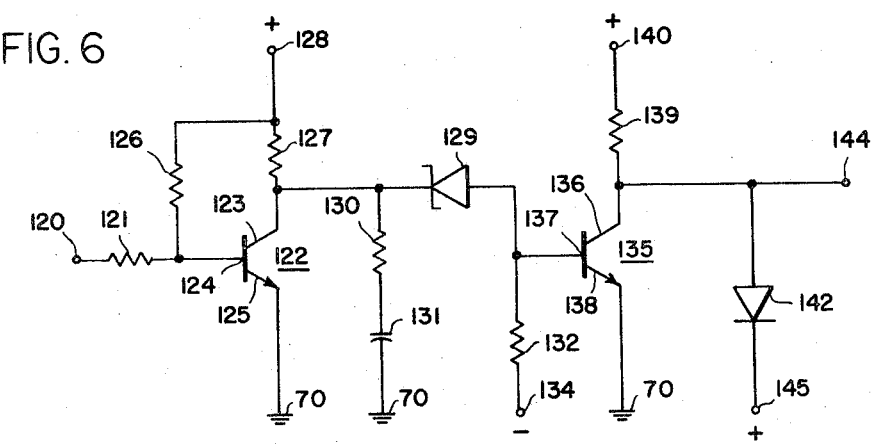
FIGURE 6 is a schematic diagram of a pulse selector circuit which could be used in the apparatus of FIGURE 2.

FIGURE 6 shows a possible embodiment of a pulse selector circuit. The pulse selector rejects all the signals which have a time duration shorter than specified minimum. It provides an output signal only if the input pulse exceeds that minimum length.

In FIGURE 6 an input terminal 120 is connected to base 124 of a transistor 122 by means of a resistor 121. Transistor 122 further has a collector 123 and an emitter 125. Emitter 125 of transistor 122 is connected to ground 70 while collector 123 is connected to a positive potential 128 through a resistor 127 and to ground potential 70 through a series combination of a resistor 130 and a capacitor 131. Base 124 of transistor 122 is also connected to positive potential terminal 128 through a resistor 126. Collector 123 of transistor 122 is further connected to a base 137 of a transistor 135 through a diode 129. Diode 129 is oriented for forward current flow from base 137 of transistor 135 to collector 123 of transistor 122. Base 137 of transistor 135 is also connected to a positive potential terminal 134 through a resistor 132. The emitter 138 of transistor 135 is connected to ground 70 while the collector 136 of transistor 135 is connected to a positive potential terminal 140 through a resistor 139, and is also connected directly to an output terminal 144. A diode 142 is further connected between the output terminal 144 and a positive potential terminal 145 to clamp the output signal at terminal 144 limiting its positive excursion to the value of the positive potential at terminal 145.

The pulse selector circuit is basically two ground emitter transistor stages. When a null signal is present at the input terminal 120, the biasing is such that the first stage is turned on and the second stage is turned off. That is, transistor 122 is conducting and transistor 135 is not conducting.

When a negative input signal is present at input terminal 120, base 124 of transistor 122 also becomes negative and transistor 122 stops conducting. This tends to make the collector 123 of transistor 122 more positive causing capacitor 131 to charge up. As capacitor 131 is charging the voltage at collector 123 is rising. As collector 123 charges up to a sufficient voltage the zener diode 129 breaks down and a current flows from positive potential terminal 128 through resistor 127, through diode 129 and through resistor 132 to a negative potential source 134. If the negative signal at input terminal 120 were removed before the voltage at collector 123 reached a sufficient level to cause zener diode 129 to break down, then transistor 122 would start conducting again causing capacitor 131 to discharge through resistor 130. To allow the voltage at collector 123 of transistor 122 to reach a sufficient magnitude, it is clear that the signal at the input terminal 120 must exist beyond certain minimum length of time. This length of time is determined by the size of capacitor 131 and resistor 127. Resistor 130 is much smaller than resistor 127 and is included only for the purpose of limiting the current protecting the circuit.

If we now assume that the signal at input 120 is of sufficient length to allow the voltage at collector 123 of transistor 122 to build up to a sufficient level causing diode 129 to break down, then as stated before a current will flow through resistor 132 causing the base 137 of transistor 135 to become positive. Transistor 135 then begins conducting and the potential at collector 136 of transistor 135 decreases to nearly ground potential since emitter 138 of transistor 135 is connected directly to ground 70. A positive signal will normally be present at the output terminal 144 but will change to nearly a ground potential when a negative pulse of sufficient time duration is presented to input terminal 120. If the pulse at the input, however, is shorter than the minimum, such pulse will have no effect on the output signal.

Many variations and embodiments are possible within the spirit of this invention. It is, therefore, understood that the specific embodiment of my invention shown here is for purposes of illustration only, and that my invention is limited only by the scope of the appended claims.

I claim as my invention:

1. A pulse generating means providing a first and a second output signal, said two output signals being comprised of a series of pulses of equal magnitude, but of opposite polarity with respect to a zero signal reference level;
   a delay means connected to receive said first output signal from said pulse generating means to delay said first output signal in time by an amount not exceeding the time duration of said pulses;
   a signal reducing means connected to said delay means adapted to reduce the magnitude of the signal applied thereto by some predetermined fraction;
   a summing means having two inputs and one output, one of said inputs connected to receive said second output signal of said pulse generating means and the other of said inputs adapted to receive the signal from said signal reducing means; and
   a zero crossing detector means connected to said summing means, adapted to receive the signal from said summing means and provide an output signal whenever the signal from said summing means crosses said zero signal reference level.

2. A pulse generating means providing a first and a second output signal, said two output signals being comprised of a series of pulses of equal magnitude, but of opposite polarity with respect to a zero signal reference level;
   a delay means connected to receive said first output signal from said pulse generating means and delay said first output signal in time by an amount not exceeding the time duration of said pulses;
   a signal reducing means connected to said delay means adapted to reduce the magnitude of the signal applied thereto by some predetermined fraction;
   a summing means having two inputs and one output, one of said inputs connected to receive said second output signal of said pulse generating means and the other of said inputs adapted to receive the signal from said signal reducing means;
   a zero crossing detector means connected to said summing means, adapted to receive the signal from said summing means and provide an output signal whenever the signal from said summing means crosses said zero signal reference level;
   and means connected to said zero crossing detector means adapted to receive said output signal from said zero crossing detector means and provide an output indicative of the time duration between consecutive pulses provided by said pulse generating means.

3. A pulse generating means providing a first and a second output signal, said two output signals being of equal magnitude, but of opposite polarity with respect to a zero signal reference level;
   a delay means connected to receive said first output signal from said pulse generating means to delay said first output signal in time by a predetermined amount;
   a signal reducing means connected to said delay means adapted to reduce the magnitude of the signal by some predetermined fraction;
   a summing means having two inputs and one output, one of said inputs connected to receive said second output signal of said pulse generating means and the other of said inputs adapted to receive the signal from said signal reducing means; and
   a zero crossing detector means connected to said summing means, adapted to receive the signal from said summing means and provide an output signal whenever the signal from said summing means crosses said zero signal reference level.

4. A support;
   a member supported on said support for relative motion with respect to said support;
   means for detecting relative motion of said member with respect to said support, said detecting means comprising a pattern of plurality of radiative lines on said member, and radiation sensitive pickoff means positioned on said support adjacent to said member adapted to observe the radiation pattern on said member and provide output signals indicative of radiation sensed thereby;
   differential amplifier means, having a first and a second output means, adapted to receive a signal from said pickoff means and provide output signals at said first and said second output means, said output signals being of equal magnitude, but of opposite polarity with respect to a zero signal reference level;
   delay means connected to receive a signal from said first output means of said differential amplifier means and delay said signal in time by a predetermined amount;
   signal reducing means connected to said delay means, adapted to reduce the magnitude of the signal by some predetermined fraction;
   summing means having two inputs and one output, one of said inputs connected to said second output means of said differential amplifier means and the other of said inputs adapted to receive said signal from said signal reducing means;
   a zero crossing detector means connected to said summing means, adapted to receive the signal from said summing means and provide an output signal whenever the signal from said summing means crosses said zero signal reference level;

and means connected to said zero crossing detector means adapted to receive signal from said zero crossing detector means and provide an output indicative of the time duration between consecutive crossings of said zero signal reference level by said output signal from said summing means.

5. A support;
a member supported on said support for relative motion with respect to said support;
means for detecting relative motion of said member with respect to said support, said detecting means comprising a pattern of plurality of radiative lines on said member, and radiation sensitive pickoff means positioned on said support adjacent to said member adapted to observe the radiation pattern on said member and provide output signals indicative of radiation sensed thereby;
differential amplifier means, having a first and a second output means, adapted to receive a signal from said pickoff means and provide complementary output signals at said first and said second output means;
delay means connected to receive a signal from said first output means of said differential amplifier means and delay said signal in time by a predetermined amount;
signal reducing means connected to said delay means, adapted to reduce the magnitude of the signal by some predetermined fraction; summing means having two inputs and one output, one of said inputs connected to said second output means of said differential amplifier means and the other of said inputs adapted to receive said signal from said signal reducing means;
a zero crossing detector means connected to said summing means, adapted to receive the signal from said summing means and provide an output signal whenever the signal from said summing means crosses the zero signal reference level.

6. A support;
a spherically shaped member supported on said support for rotation about a spin axis;
means for detecting relative motion of said member with respect to said support, said detecting means comprising a pattern of plurality of radiative lines on said member, and radiation sensitive pickoff means positioned on said support adjacent to said member adapted to observe the radiation pattern on said member and provide output signals indicative of radiation sensed thereby;
differential amplifier means, having a first and a second output means, adapted to receive a signal from said pickoff means and provide complementary output signals at said first and said second output means;
delay means connected to receive a signal from said first output means of said differential amplifier means and delay said signal in time by a predetermined amount;
signal reducing means connected to said delay means, adapted to reduce the magnitude of the signal by some predetermined fraction; summing means having two inputs and one output, one of said inputs connected to said second output means of said differential amplifier means and the other of said inputs adapted to receive said signal from said signal reducing means;
a zero crossing detector means connected to said summing means, adapted to deceive the signal from said summing means and provide an output signal whenever the signal from said summing means crosses the zero signal reference level.

References Cited by the Examiner
UNITED STATES PATENTS 2,959,060  11/1960  Kunz _____ 74—5.6

FRED C. MATTERN, JR., *Primary Examiner*,
PALMER W. SULLIVAN, *Examiner*.